United States Patent
Coffin, Jr. et al.

[15] 3,652,226
[45] Mar. 28, 1972

[54] ANODIC INHIBITOR-COLOR METHOD FOR DETECTING CRACKS IN METAL BODIES

[72] Inventors: Louis F. Coffin, Jr.; Lyman A. Johnson, both of Schenectady, N.Y.

[73] Assignee: General Electric Company, Schenectady, N.Y.

[22] Filed: Dec. 31, 1969

[21] Appl. No.: 889,699

[52] U.S. Cl. .......................... 23/230 R, 23/230 C, 252/408, 73/104, 250/71, 148/6.1, 148/6.2
[51] Int. Cl. .................. G01n 21/16, G01n 21/38, C23f 7/26
[58] Field of Search .......................... 23/230, 230 C; 252/408; 73/104; 250/71; 148/6.1, 6.14, 6.2

[56] References Cited

UNITED STATES PATENTS 3,490,873   1/1970   Corl ........................................ 23/230
2,007,285   7/1935   Schanffele .............................. 23/230

Primary Examiner—Morris O. Wolk
Assistant Examiner—Elliott A. Katz
Attorney—Charles T. Watts, Paul A. Frank, Jane M. Binkowski, Frank L. Neuhauser, Oscar B. Waddell and Joseph B. Forman

[57] ABSTRACT

A nondestructive color method for detecting cracks in a metal body by selective corrosion of the surface portion within the cracks. Specifically, a color-forming electrolyte containing halide ions, a color-forming indicator and an anodic inhibitor is applied to the surface of the body to be tested. The electrolyte solution is formulated so that it does not corrode to any significant extent the open surface portion of the body but is sufficiently reactive to corrode the surface portion within cracks, resulting in the formation of metallic ions. The color-forming indicator is of the type which reacts with the thus formed metal ions to form a distinctive colored compound at the crack locations.

10 Claims, No Drawings

ANODIC INHIBITOR-COLOR METHOD FOR DETECTING CRACKS IN METAL BODIES

This invention relates to a non-destructive method for detecting cracks in a metal body. In particular, the invention contemplates a process resulting in improved economy and versatility for inspection of metal bodies whereby a clear, precise, reproducible record of the inspection results is rapidly obtained.

Metal fatigue causes 75 percent of all the serious engine failures in jet aircraft today. If adequate inspection techniques were available, these failures could be prevented. The fatigue process is a slow one; early in the process small microcracks are nucleated either at grain boundaries intersecting the surface, at hard precipitate particles at or near the surface, or other surface flaws. These microcracks grow at a very slow but accelerating rate leading to a large crack which will eventually cause catastrophic failure if it remains undetected. Since the fatigue crack grows slowly, there is usually ample opportunity to detect the crack during inspection periods before it grows to a critical size.

Current crack detection techniques rarely are able to detect cracks smaller than three mils in depth, and in most circumstances 10 to 15 mils is usually the lower limit of detectability. With the more traditional structural alloys and conservative design, a crack can grow to much larger than this detection threshold before it becomes critical in size. But in the newer, high temperature alloys, which have a much lower toughness and are designed for much higher stress levels, the critical crack size begins to approach the limit of detectability. Under these conditions detection techniques of the prior art are not adequate.

A typical detection process widely used in industry utilizes penetrants known in the art which include various liquids mixed with a dye in combination with a developer or blotting agent. The use of such a liquid penetrant generally comprises application of the penetrant to the surface of the metallic specimen followed by a soaking period of at least about 30 minutes to permit penetration into cracks, if any. The excess penetrant is then removed usually with a suitable solvent. A developer or blotting agent which contains a powder such as ground silica or talc, is then applied to the surface to provide a contrasting background to make the dye more visible and to blot the liquid dye out of the surface cracks by absorption. The pattern of blots shows the general location of cracks as well as other surface discontinuities.

These dye penetrant inspection procedures of the prior art have several drawbacks. They require a number of steps and are time consuming. The effectiveness of the liquid penetrant depends on its wetting properties. The penetrant must not only be able to flow into a crack but also to be absorbed out of it by a developer, and therefore, cracks almost closed at their mouths would not be detected in most instances. In addition, known liquid penetrants are limited regarding temperatures at which they may be used and begin losing their penetrating power at temperatures below 70° F. due to varying surface tension and flow characteristics. Also, the blotting action of the developer depends upon its absorption of the liquid dye penetrant. Since this absorbing action continues as long as liquid dye remains in contact with the developer, the pattern initially produced quickly becomes fuzzy and definition is lost in a matter of minutes. Moreover, the definition obtained in the dye pattern depends partly upon grain size of the developer, and since larger grain sizes produce poorer definition, developers of very uniform small grain size are required. In addition, the test specimens must be handled with care to prevent wiping off of the developer. Also, and most importantly, the mass of blots produced by conventional penetrants may be the result of normal surface scratches or other surface irregularities, making the detection of structural microcracks difficult.

To avoid the use of developers, some prior art methods use a fluorescent penetrant. Typically, this comprises applying to the surface of the test body the luminescent penetrant, removing the penetrant remaining on the surface generally by solvent cleaning, and then inspecting the surface of the body in darkness under fluorescigenous radiation such as ultraviolet light or "black light" for the portion of the penetrant which had penetrated into the surface openings. The particular problem with this type of method is that many large castings and like bulky articles are not readily transported to locations which may be darkened as required for inspection. Such heavy bodies are also handled with considerable difficulty during the inspection procedure once the location is satisfactorily darkened. In addition, the sources of the required fluorescigenous radiations, almost exclusively high intensity mercury vapor arcs, are relatively expensive special equipment. Also, some operators required to inspect test bodies continuously under such sources complain of the undesirable effect of continued eyeball fluorescence. In some applications the method is too sensitive in that it is difficult to distinguish between normal surface irregularities and structural cracks, and the result has been over-inspection and excessive rejection by inexperienced operators.

The present invention overcomes the drawbacks of the prior art methods. It can be carried out in a single step in normal light in a matter of minutes, generally up to about 15 minutes, and frequently, within shorter periods of time and does not use a developer or blotting agent. The present process is also particularly satisfactory for detecting cracks which are tightly closed at their mouths. This is of particular importance since parts are inspected usually in an unstressed, cold condition which commonly leaves the cracks tightly closed.

Briefly stated, the process of the present invention comprises applying to the surface of a metal body to be tested a color-forming electrolyte which forms a distinctive colored compound at crack locations in the body. Specifically, the electrolyte is an aqueous solution containing halide ions, a color-forming indicator and an anodic inhibitor. The electrolyte is formulated so as not to corrode the open surface portion of the metallic material, but to corrode the internal surface portion contained within the cracks resulting in the formation of metallic ions within the cracks. The color-forming indicator is of the type which reacts with the thus formed metal ions to produce a distinguishing colored compound.

The present process detects cracks in a metal body by selective corrosion of the surface portion within the cracks. By corrosion, it is meant herein the dissolution of the metal by its liquid environment. The bodies of metallic material which are useful in the present invention are those which, because of the presence of the anodic inhibitor in the present electrolyte indicating solution, will exhibit what is generally known in the art as the phenomenon of crevice corrosion. Representative of these metallic materials are iron, low alloy steels, medium alloy steels and iron-carbon alloys known as plain carbon steels.

In carrying out the process of the present invention, the surface of the metal body to be tested should be cleaned to reduce background indications so that a cleaner and sharper indication of cracks can be produced. Conventional methods of cleaning metals can be used such as by wiping the surface with a suitable organic solvent to remove oils and grease or by mild grit blasting to remove adherent surface contaminants such as paint and scale.

The color-forming electrolyte is always an aqueous solution containing halide ions, a color-forming indicator and an anodic inhibitor, and its specific formulation is determinable empirically. The anodic inhibitor is used in an amount within a range sufficient to passivate the open surface portion of the metallic material so that it will exhibit the phenomenon of crevice corrosion, i.e., it should not be used in an amount which would passivate to a significant extent the surface portion within a crack in the material. Typical anodic inhibitors include sodium dichromate, sodium chromate, potassium chromate, potassium dichromate, sodium bicarbonate, borax, pyrophosphate and calcium carbonate. The specific anodic inhibitor used depends largely on the metallic material to be tested. In general the amount of inhibitor should be very small, of the order of a few tens of parts per million, and the lower the halide ion concentration, the lower should be the inhibitor concentration. Specifically, the concentration of the anodic inhibitor in the electrolyte solution generally may range from about 0.0001 Molar or lower to about 0.05 Molar.

The halide ions useful in the present process can be chloride, bromide, iodide and fluoride ions. Chloride ions produce the best results and are preferred. Usually, for a majority of metallic materials of the present invention, the halide ions in the electrolyte are provided by a metal halide salt. Representative of these salts are sodium chloride, potassium chloride, sodium bromide, potassium bromide, sodium iodide and potassium iodide. The salt should be used in the electrolyte aqueous solution in an amount sufficient to provide enough halide ions to accelerate corrosion within cracks to result in a colored compound being formed in a reasonable period of time, generally within about 15 minutes. However, the salt should not be used in an amount which would cause the electrolyte to corrode the open surface portion of the metal to any significant extent. In addition, the metal halide salt should be selected so that its metal ions do not form a colored compound with the color-forming indicator. The concentration of the metal salt used to provide the halide ions in the electrolyte solution can vary widely depending largely upon the particular salt used and the metal being tested but it generally ranges from about 0.05 to about 2 Molar.

Upon application of the electrolyte indicating solution to the surface to be tested, it acts to corrode the surface portion within cracks to cause the formation of metal ions. The resulting positively charged metal ions hydrolyze in the surrounding electrolyte in the crack, increasing its acidity and thereby increasing the corrosion rate within the crack. In addition, the positively charged metal ions formed within the crack attract some of the halide ions of the electrolyte which accelerates corrosion therein. The color-forming indicator reacts with the metal ions produced by corrosion in the crack to form a distinctive colored compound at the crack locations in a matter of minutes, generally up to about 15 minutes and frequently within a shorter period of time.

The corrosive strength of the electrolyte is determined largely by the difference in the rate of corrosion between the open surface portion of the metallic material and the surface portion within a crack therein, i.e., it should be sufficiently strong to corrode the surface portion within a crack but not the open surface portion of the material to any significant extent. The composition of the electrolyte is not significantly changed at the free or open surface portion but its composition does change at the surface portion within a crack becoming increasingly acidic. This is due to a number of factors such as, for example, a lack of oxygen within the crack. The useful halide ion content of an electrolyte generally falls within a specific range for a particular metallic material so that the distinctive colored compound which indicates the crack locations is formed in a reasonable period of time, generally within about 15 minutes. Stronger electrolytes are preferably used where cracks of very small depth must be detected since these cracks corrode at a rate slower than deeper cracks. In addition, the stronger electrolyte, i.e., more corrosive, within a range are preferably used to locate cracks which are closed at their mouths. In this instance, the indicating solution enlarges the mouth of the crack by corrosion and flows in.

For some metallic materials of the present invention, the halide ions can be provided by hydrochloric, hydrobromic, hydroiodic or hydrofluoric acid provided the acid is sufficiently dilute in the electrolyte so that it does not corrode the open surface portion of the metal but does corrode the surface portion within a crack therein. Again, such corrosion should result in a colored compound being formed in a reasonable period of time, generally within about 15 minutes.

The color-forming indicator is one which reacts with the metal ions formed by corrosion of the surface portion within the crack to produce a colored compound. For example, in the case of iron, low and mild alloy steels, ferrous ions are formed by corrosion within the crack. One of the most satisfactory color-forming indicators for ferrous ions is potassium ferricyanide $K_3Fe(CN)_6$ which reacts with the ferrous ions to form a deep blue precipitate of ferrous ferricyanide known as Turnbull's blue. The reaction is as follows:

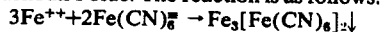

Additionally, ferric ion reacts with any ferrocyanide ion present to form a precipitate of Prussian blue as follows:

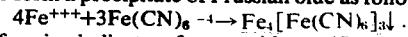

Color-forming indicators for use with specific metal ions are well known in the literature. For example, an extensive list is disclosed in Feigl, F., Qualitative Analysis By Spot Tests, 3rd ed., Elsevier Pub., N.Y. 1946.

The amount of color-forming indicator is determinable empirically, and generally, amounts resulting in a concentration in the electrolyte solution of about 0.0005 to about 0.01 Molar are satisfactory.

The present process can be carried out in a number of ways. The electrolyte may simply be applied on the surface area of the metal body to be tested in a conventional manner such as from an eye dropper or other conventional means. After a short period of time, a distinctive colored compound will become visible at the crack locations. If desired, the part to be tested may be immersed in the electrolyte, and after a short period of time, a colored compound will become visible at crack locations.

The colored compound which indicates crack locations is easily removed. It may be removed by simply wiping it off with a cloth or paper such as Kimwipe. Generally, it can be removed most readily by applying to the colored-compound carrying surface a complexing agent and then wiping off the complexed compound. Typical complexing agents include ethylene diamine tetraacetic acid and Biguanide $[H_2NC(:NH)]_2NH$.

A wetting agent can be included in the present electrolyte to increase its penetrating power. Conventional wetting agents can be used and they may be anionic, cationic or nonionic. The wetting agent should not be decomposed or degraded by the electrolyte to any significant extent. The amount of wetting agent used is not critical and may vary within a wide range depending on the increased penetration produced by a specific amount. Generally, satisfactory results are obtained with amounts of wetting agent ranging from about 0.01 to about 2 percent by volume of the electrolyte solution. Representative of the anionic wetting agents are sodium salts of organic sulfonates, especially alkylaryl sulfonates such as the sulfonates of dodecylbenzene, as for example, disodium-4-dodecylated oxydibenzenesulfonate. Other representative anionic surfactants include sodium alkylnapththalenesulfonate, sodium N-methyl-N-oleyltaurate, sodium oleylisethionate and the sodium salt of sulfated nonyl phenoxypoly (ethyleneoxy) ethanol. Typical cationic surfactants include lauryltrimethylammonium chloride and octadecyltrimethylammonium chloride. Examples of nonionic surfactants are polyethylene glycol lauryl ether and tris (polyoxyethylene) sorbitan monolaurate.

As disclosed in U.S. Pat. application Ser. No. 889,694 filed of even date herewith in the name of Michael F. Henry and assigned to the assignee hereof, and which by reference is made part of the disclosure of the present application, a particularly clear indication of cracks can be obtained by initially treating the surface of the metal to passivate the open surface portion. Specifically, roughness or normal voids in the surface frequently cause spotty background of varying color intensity in the test for cracks and makes detection of the cracks more difficult. To substantially reduce such a background, the surface to be tested is pre-treated, preferably, with the present color-forming electrolyte. Specifically, such pre-treatment comprises applying a thin coating of the solution onto the surface, and after a specific short period of time, wiping off the coating. It is believed that the electrolyte passivates the background causing areas of the surface, i.e., forms a passive film thereon. Preferably, the coating is applied by saturating an absorbent material such as cotton with the indicating solution and rubbing it onto the surface. After a short period of time which can be determined empirically, and which generally ranges up to about 15–30 seconds, the coating is removed with a conventional material such as cloth or paper so as not to break to any significant extent the just-formed passive film. The electrolyte coating should be wiped off before any significant amount of it enters a crack and thereby passivates the surface portion therein.

The invention is further illustrated by the following examples.

In the following examples, an AISI-SAE 4140 steel, a low alloy steel, was used. The alloy is composed of C—0.38–0.43 percent, Mn—0.75–1.00, P—0.040 max., S—0.040 max., Si—0.20–0.35, Cr—0.80–1.10, Mo—0.15–0.25 and Fe—balance. This metallic material is used in the aircraft industry as a compressor disc alloy which is an application that undergoes considerable fatigue.

EXAMPLE 1

A bar of the steel, 8 inches long, 0.5 inch wide and 0.125 inch thick was cut and a gage section was carefully surface ground in one direction. The bar was then fatigued by reverse bending to cause microcracks in the direction normal to that of the grinding direction. These microcracks could be seen under a high powered microscope. (In normal operation, the cracks would not be distinguishable under a microscope since they usually occur in the same direction as the surface grinding marks).

An aqueous electrolyte was formed using distilled water which was comprised of 1 Molar sodium chloride, 0.005 Molar sodium dichromate ($Na_2Cr_2O_7 \cdot 2H_2O$) and 0.002 Molar potassium ferricyanide. The electrolyte solution was applied to a surface of the gage section of the bar at room temperature from an eye dropper to cover the entire surface being tested. Within about 1 minute a deep blue precipitate occurred at the crack locations and was clearly visible in normal room light. The blue precipitate was then cleaned off by wiping the surface with Kimwipe paper. There was no visual evidence of any significant corrosion of the surface tested.

EXAMPLE 2

The procedure used in this example was the same as that set forth in Example 1 except that another bar was used and the electrolyte solution was comprised of 0.1 Molar sodium chloride, 0.002 Molar potassium ferricyanide, 0.005 Molar sodium dichromate ($Na_2Cr_2O_7 \cdot 2H_2O$) and 0.125 Molar hydrochloric acid. Within about 1 minute, a deep blue precipitate occurred at the crack locations and was clearly visible in normal light. The blue precipitate was then cleaned off by wiping the surface with Kimwipe paper. There was no visual evidence of any significant corrosion of the surface tested.

EXAMPLE 3

The procedure used in this example was the same as that set forth in Example 1 except that another bar was used and the electrolyte contained about 0.1 ml. of a wetting agent sold under the trademark Aquet which is a nonionic alkyl aryl polyethylene glycol liquid. Within about 1 minute, a deep blue precipitate occurred at the crack locations and was clearly visible in daylight. The blue precipitate was then cleaned off by wiping the surface with Kimwipe paper. There was no visual evidence of any significant corrosion of the surface tested.

In copending U.S. Pat. application Ser. No. 889,696 entitled "Color Method For Detecting Cracks In Metal Bodies" filed of even date herewith in the names of Louis F. Coffin, Jr. and Lyman A. Johnson and assigned to the assignee hereof there is disclosed a color method for detecting cracks in a metal body using a color-forming aqueous acid indicating solution which contains halide ions, and a color-forming indicator.

In copending U.S. Pat. Application Ser. No. 889,693 entitled "Pre-Passivation-Color Method For Detecting Cracks In Metal Bodies" filed of even date herewith in the name of Michael F. Henry and assigned to the assignee hereof there is disclosed a process combining pre-passivation with a color method for detecting cracks in metal bodies wherein a color-forming aqueous acid indicating solution containing halide ions and a color-forming indicator is used.

In copending U.S. Pat. application Ser. No. 889,695 entitled "Method For Detecting Cracks In Metal Bodies" filed of even date herewith in the names of Lyman A. Johnson and Michael F. Henry and assigned to the assignee hereof there is disclosed the selective corrosion of the surface portion within cracks to enlarge them sufficiently so that they can be detected by a conventional technique using a conventional liquid.

All of the above cited patent applications are, by reference, made part of the disclosure of the present application.

What is claimed is:

1. A color process for detecting cracks in a metal body by selective corrosion of the surface portion within the cracks to produce a colored compound at said cracks which comprises applying to the surface of the metal body to be tested a color-forming electrolyte which is an aqueous solution of a metal chloride, a color-forming indicator and an anodic inhibitor, said electrolyte being formulated so that it does not corrode the open surface portion of the metal body but is reactive with the surface portion within the cracks to produce metal ions, and said color-forming indicator being reactive with the resulting metal ions to produce a colored compound, said metal body being of the type which undergoes crevice corrosion when treated with said color-forming electrolyte, and said process being carried out at room temperature within a period of 15 minutes.

2. A process according to claim 1 wherein the metal body is selected from the group consisting of iron, low alloy steels, medium alloy steels and plain carbon steels.

3. A process according to claim 1 wherein said anodic inhibitor is selected from the group consisting of sodium dichromate, sodium chromate, potassium chromate, potassium dichromate, sodium bicarbonate, borax, pyrophosphate and calcium carbonate.

4. A process according to claim 1 wherein said metal salt is sodium chloride.

5. A process according to claim 1 wherein the color-forming electrolyte contains a wetting agent.

6. A process according to claim 1 wherein the composition of said color-forming electrolyte is comprised of a metal chloride salt in a concentration of about 0.05 to 2 Molar, a color-forming indicator in a concentration of about 0.0005 to about 0.01 Molar, and an anodic inhibitor in a concentration of about 0.0001 to about 0.05 Molar.

7. A process for detecting cracks in an iron alloy metal body by selective corrosion of the surface portion within the cracks to produce a blue precipitate at said cracks, which comprises applying to the surface of the metal body a color-forming electrolyte which is an aqueous solution of sodium chloride, potassium ferricyanide and sodium dichromate, said solution being formulated so that it does not corrode the open surface portion of the metal body but is reactive with the surface portion within the cracks to produce ferrous ions and said potassium ferricyanide reacting with the resulting ferrous ions to produce a blue precipitate at said cracks, said iron alloy metal body being of the type which undergoes crevice corrosion when treated with said color-forming electrolyte, and said process being carried out at room temperature within a period of 15 minutes.

8. A process according to claim 7 wherein said color-forming electrolyte contains a wetting agent.

9. A process according to claim 7 wherein said anodic inhibitor is selected from the group consisting of sodium dichromate, sodium chromate, potassium chromate, potassium dichromate, sodium bicarbonate, borax, pyrophosphate and calcium carbonate.

10. A process according to claim 7 wherein said sodium chloride is present in a concentration of about 0.05 to 2

Molar, potassium ferricyanide is present in a concentration of about 0.0005 to about 0.01 Molar and sodium dichromate is present in a concentration of about 0.0001 to about 0.05 Molar.

* * * * *